US008670769B2

(12) United States Patent
Kobayashi et al.

(10) Patent No.: US 8,670,769 B2
(45) Date of Patent: Mar. 11, 2014

(54) RADIO COMMUNICATION SYSTEM AND RADIO COMMUNICATION METHOD

(75) Inventors: Rumi Kobayashi, Tokyo (JP); Atsushi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 13/376,935

(22) PCT Filed: Jun. 1, 2010

(86) PCT No.: PCT/JP2010/003671
§ 371 (c)(1),
(2), (4) Date: Dec. 8, 2011

(87) PCT Pub. No.: WO2010/146785
PCT Pub. Date: Dec. 23, 2010

(65) Prior Publication Data
US 2012/0083269 A1     Apr. 5, 2012

(30) Foreign Application Priority Data

Jun. 15, 2009   (JP) .................................. 2009-142050

(51) Int. Cl.
*H04W 4/00*     (2009.01)
*H04W 36/00*    (2009.01)

(52) U.S. Cl.
USPC ........... 455/444; 455/434; 455/436; 455/443; 370/328

(58) Field of Classification Search
USPC .................. 455/444, 434, 436, 443; 370/328
See application file for complete search history.

(56) References Cited

U.S. PATENT DOCUMENTS

2007/0213067 A1* 9/2007 Li et al. ..................... 455/444

2009/0238114 A1* 9/2009 Deshpande et al. .......... 370/328

FOREIGN PATENT DOCUMENTS

| CN | 101123823 A | 2/2008 |
|---|---|---|
| CN | 101242627 A | 8/2008 |
| EP | 1 956 771 A2 | 8/2008 |
| JP | 2001505385 A | 4/2001 |
| JP | 2008271398 A | 11/2008 |
| WO | 2007103062 A | 9/2007 |

OTHER PUBLICATIONS

International Search Report for PCT/JP2010/003671 mailed Sep. 7, 2010.
Chinese Office Action for CN Application No. 201080026438.7 issued on Oct. 30, 2013 with English Translation.

* cited by examiner

*Primary Examiner* — Opiribo Georgewill
(74) *Attorney, Agent, or Firm* — Sughrue Mion, PLLC

(57) ABSTRACT

Provided is a radio communication system which enables optimal cell switching. A broker femtocell base station is installed in an entrance of the buildings, and sub-femtocell base stations are installed in the buildings. An adjacent cell list and broker femtocell priority selection setting information are set as system information notified from a macro cell, the adjacent cell list including a broker PSC of the broker femtocell base station and PSCs of adjacent macro cells, the broker femtocell priority selection setting information being the information for preferentially selecting the broker femtocell base station. An adjacent cell list and sub-femtocell priority selection setting information are set as system information of the broker femtocell, the adjacent cell list including a PSC of a macro cell, and a sub PSC of an adjacent femtocell, the sub-femtocell priority selection setting information being the information for preferentially selecting the sub-femtocell base station.

12 Claims, 16 Drawing Sheets

(MACRO CELL MC10)

ADJACENT CELL LIST #1000

| ADJACENT CELL | PSC |
|---|---|
| MACRO CELL MC11 | 101 |
| MACRO CELL MC12 | 102 |
| BROKER FEMTOCELL | 511 |

Fig. 4

(BROKER FEMTOCELL 511)

ADJACENT CELL LIST #1100

| ADJACENT CELL | PSC |
|---|---|
| MACRO CELL MC10 | 100 |
| SUB-FEMTOCELL FC509 | 509 |
| SUB-FEMTOCELL FC510 | 510 |

Fig. 5

(SUB-FEMTOCELL 509)

ADJACENT CELL LIST #1200

| ADJACENT CELL | PSC |
|---|---|
| BROKER FEMTOCELL FC511 | 511 |
| SUB-FEMTOCELL FC510 | 510 |

Fig. 6

(SUB-FEMTOCELL FC510)

ADJACENT CELL LIST #1300

| ADJACENT CELL | PSC |
|---|---|
| BROKER FEMTOCELL FC511 | 511 |
| SUB-FEMTOCELL FC509 | 509 |

Fig. 7

(BROKER FEMTOCELL FC611)

ADJACENT CELL LIST #2100

| ADJACENT CELL | PSC |
|---|---|
| MACRO CELL MC10 | 100 |
| SUB-FEMTOCELL FC613 | 509 |

Fig. 10

(BROKER FEMTOCELL FC612)

ADJACENT CELL LIST #2200

| ADJACENT CELL | PSC |
|---|---|
| MACRO CELL MC10 | 100 |
| SUB-FEMTOCELL FC614 | 510 |

Fig. 11

(SUB-FEMTOCELL FC613)

ADJACENT CELL LIST #2300

| ADJACENT CELL | PSC |
|---|---|
| BROKER FEMTOCELL | 511 |
| SUB-FEMTOCELL FC614 | 510 |

Fig. 12

(SUB-FEMTOCELL FC614)

ADJACENT CELL LIST #2400

| ADJACENT CELL | PSC |
|---|---|
| BROKER FEMTOCELL | 511 |
| SUB-FEMTOCELL FC613 | 509 |

Fig. 13

(BROKER FEMTOCELL FC711)

ADJACENT CELL LIST #3100

| ADJACENT CELL | PSC |
|---|---|
| MACRO CELL MC10 | 100 |
| SUB-FEMTOCELLS FC701, FC703 | 509 |
| SUB-FEMTOCELL FC702 | 510 |

Fig. 16

ADJACENT CELL LIST

| ADJACENT CELL | PSC |
|---|---|
| MACRO CELL 11 | 101 |
| MACRO CELL 12 | 102 |

Fig. 19

RADIO COMMUNICATION SYSTEM AND RADIO COMMUNICATION METHOD

TECHNICAL FIELD

The present invention relates to a radio communication system. More specifically, the present invention relates to a radio communication system that uses a small base station (femtocell base station) having a coverage area of about several tens of meters in radius called femtocell.

BACKGROUND ART

FIG. 18 shows a configuration of a related radio communication system.

In FIG. 18, a plurality of radio base stations 10, 11, and 12 that are separated from one another are provided, and each of the radio base stations 10, 11, and 12 covers a predetermined area. The radio base stations 10, 11, and 12 respectively have coverage areas of macro cells MC10, MC11, and MC12, each of which typically having a cell radius of about several km to 10 km. In FIG. 18 the radio base station 10 covers the area of the macro cell MC10, the radio base station 11 covers the area of the macro cell MC11, and the radio base station 12 covers the area of the macro cell MC12.

A radio network controller (RNC: mobile communication control station) 220 controls communication links of the plurality of radio base stations 10, 11, and 12.

The RNC 220 performs radio network control, call processing and the like when the location of a mobile communication terminal 900 is registered, when the mobile communication terminal 900 makes or receives a call, and when the mobile communication terminal 900 performs a handover process.

A core network 230 includes a location register (LR: home memory station) 231, and a gate way (GW: mobile communication network gateway control station) 232, and forms a core dedicated line of a cellular telephone communication.

Now, the macro cell MC11 and the macro cell MC12 are adjacent to the macro cell MC10.

In this case, adjacent cell information is included in system information transmitted from the radio base station 10 to the macro cell MC10.

A primary scramble code (PSC) of a cell may be used as a code to identify the cell. Specifically, the radio base station 10 transmits primary scramble codes (PSCs) of the macro cell MC11 and the macro cell MC12 that are adjacent cells to the coverage area as the adjacent cell list as shown in FIG. 19.

The mobile communication terminal (UE: User Equipment) 900 communicates with a radio base station specifying the macro cell covering its own location by radio to establish a communication link with a communication apparatus of the other party by way of the network 230.

In FIG. 18, the mobile communication terminal 900 is in the area of the macro cell MC10. Thus, the mobile communication terminal establishes the communication with the radio base station 10. When the mobile communication terminal 900 moves to cross the border of macro cells, a radio base station with which the mobile communication terminal 900 communicates is switched according to the movement between cells in order to maintain the communication without cutting the communication link.

For example, as shown in FIG. 18, when the mobile communication terminal moves from the area covered by the macro cell MC10 to the area covered by the macro cell MC11, the base station with which the mobile communication terminal 900 communicates is switched from the radio base station 10 to the radio base station 11.

In this case, the mobile communication terminal searches candidates of neighboring macro cells that can be selected using the PSCs of the adjacent cell list notified in the macro cell MC10 which is the area covering the mobile communication terminal.

A radio base station having high reception intensity is selected among the candidates, and the communication link is established.

Such a handover control is disclosed, for example, in Patent literature 1 (Japanese Unexamined Patent Application Publication No. 2008-271398) and Patent literature 2 (Published Japanese Translation of PCT International Publication for Patent Application, No. 2001-505385).

Incidentally, intensity of radio waves from a radio base station becomes weak inside a building or underground, where communication is limited or unavailable.

In order to deal with such a problem, a small-scale base station that covers an area (cell radius) of about several tens of meters has been proposed as a base station used in a radio communication system.

A cell formed by such a small-scale base station is called a "femtocell".

FIG. 20 shows a state in which femtocell base stations 15 are installed.

Compared with the macro cell MC10 having a cell radius of about several km to 10 km, the femtocell has an extremely small cell radius.

Further, the femtocell base station 15 is connected to fixed communication lines such as an asymmetric digital subscriber line (ADSL), optical fibers, coaxial cables, through which a communication service of a cellular telephone may be provided.

The base station can be installed in the building in a simple manner by installing the femtocell base station in the building or the like and connecting the femtocell base station to a broadband line that is already installed.

With such a femtocell base station, the number of base stations can be increased in a simple manner and with low cost compared to the case of installing a large macro cell base station. The femtocell base station is a promising technique to further improve the service of a mobile communication network.

CITATION LIST

Patent Literature

[Patent Literature 1]
Japanese Unexamined Patent Application Publication No. 2008-271398
[Patent literature 2]
Published Japanese Translation of PCT International Publication for Patent Application, No. 2001-505385

SUMMARY OF INVENTION

Technical Problem

When the mobile communication terminal 900 is in the coverage area of the femtocell, the mobile communication terminal 900 needs to set the femtocell base station 15 as the base station with which the mobile communication terminal 900 communicates. One possible method to deal with this is, as in a conventional technique, to include information of all the cells that are switching candidates in the system information. In short, the PSCs used by the respective femtocell base stations are included in the adjacent cell list of the macro cell.

Consider that the femtocell base stations are installed in the building or each room in the macro cell having an area of several km to 10 km in radius. Then there are quite a number of femtocells that are switching candidates for one macro cell. Therefore, if different PSCs are used for each femtocell, it is required to include extremely large amount of cell information in the adjacent cell list.

In reality, however, it is completely impossible since the information exceeds the upper limit of the information amount that can be notified, and it is impossible to use the femtocells that are not registered in the adjacent cell list of the macro cell.

It may be possible to assign the same PSC to all the femtocells.

In this case, it is only required to add one PSC as the adjacent cell list.

It may be possible to assign the same PSC to all the femtocells if the number of femtocell base stations is small and the femtocells are not adjacent to one another.

In practice, however, a femtocell may be installed in each room in one building.

When a user moves a room, the mobile communication terminal needs to recognize that the movement is made to cross the femtocells. However, the mobile communication terminal cannot identify the femtocells to which the same PSC is assigned.

As described above, the mere use of a cell switching system in the conventional radio communication system using a macro cell is not enough to deal with a future system in which a number of femtocell base stations are installed.

If a large number of femtocell base stations are installed in a building in the future, any means to select an appropriate base station according to the movement among cells is strongly desired.

Patent literature 2 discloses a communication system in which a microcellular network is built inside a building.

The microcellular network inside the building includes a plurality of distributed antennas distributed inside the building.

A gateway base station that constructs a gateway cell is installed near an entrance of the building.

The handover from a macro cell network to a microcell network is allowed only through this gateway base station. In other words, an identity of the gateway base station and an identity of the neighboring macro cell base stations are included in the neighboring cell list related to the base station of the macro cell network.

According to this configuration, handover is executed from the macro cell network to the microcellular network through the gateway base station, and the radio communication using the microcellular network is preferentially executed in the building.

However, when different identities are set for each microcellular network, this also results in large amount of adjacent cell information of the macro cell network.

Furthermore, although the base station having the strongest radio waves is selected after measuring the intensity of radio waves around the gateway base station, the intensity of radio waves of the macro cell base station may often be stronger in places like an entrance of a building which is open to the outside even it is near the femtocell base station. Then, it is impossible to switch to the microcellular network in the gateway base station, which results in no use of the microcellular network.

In this case, it is highly likely that the communication is interrupted when the user enters an inner part of the building.

Further, Patent literature 2 assumes a case in which the microcellular network having a series of distributed antennas is built inside the building. However, when a number of small femtocell base stations are installed inside the building, handover between these femtocell base stations needs to be considered. Therefore, it is impossible to simply apply the configuration of Patent literature 2 to the communication system having femtocells.

One exemplary object of the present invention is to provide a radio communication system which enables optimal cell switching in a service area of radio communication including a number of femtocells in addition to a macro cell.

Solution to Problem

A radio communication system according to the present invention includes a macro cell base station for performing radio communication with a mobile communication terminal to relay telephone conversation between mobile communication terminals, the macro cell base station covering an area of a macro cell; and a plurality of femtocell base stations installed in a plurality of buildings in the macro cell, each of the femtocell base stations covering an area narrower than the macro cell, in which a broker femtocell base station that covers an area of an entrance is installed in the entrance of each of the buildings, and a broker identification code as an identification code is set for the broker femtocell base station, and an adjacent cell list and broker femtocell priority selection setting information are set as system information of the macro cell, the adjacent cell list including an area identification code of each of adjacent macro cells and the broker identification code set for the broker femtocell base station, the broker femtocell priority selection setting information being the information for preferentially selecting the broker femtocell base station.

A radio communication method according to the present invention uses a radio communication system including: a macro cell base station for performing radio communication with a mobile communication terminal to relay telephone conversation between mobile communication terminals, the macro cell base station covering an area of a macro cell; and a plurality of femtocell base stations installed in a plurality of buildings in the macro cell, each of the femtocell base stations covering an area narrower than the macro cell, in which a broker femtocell base station that covers an area of an entrance is installed in the entrance of each of the buildings and a broker identification code as an identification code is set for the broker femtocell base station, and an adjacent cell list and broker femtocell priority selection setting information are set as system information of the macro cell, the adjacent cell list including an area identification code of each of adjacent macro cells and the broker identification code set for the broker femtocell base station, the broker femtocell priority selection setting information being the information for preferentially selecting the broker femtocell base station.

BRIEF DESCRIPTION OF DRAWINGS

FIG. 4 shows an adjacent cell list transmitted from a macro cell base station to a macro cell according to the first exemplary embodiment;

FIG. 5 shows an adjacent cell list transmitted from a broker femtocell base station to a broker femtocell according to the first exemplary embodiment;

FIG. 6 shows an adjacent cell list transmitted from a sub-femtocell base station to a sub-femtocell according to the first exemplary embodiment;

FIG. 7 shows an adjacent cell list transmitted from a sub-femtocell base station to a sub-femtocell according to the first exemplary embodiment;

FIG. 10 shows an adjacent cell list transmitted from a broker femtocell base station to a broker femtocell according to the second exemplary embodiment;

FIG. 11 shows an adjacent cell list transmitted from a broker femtocell base station to a broker femtocell according to the second exemplary embodiment;

FIG. 12 shows an adjacent cell list transmitted from a sub-femtocell base station to a sub-femtocell according to the second exemplary embodiment;

FIG. 13 shows an adjacent cell list transmitted from a sub-femtocell base station to a sub-femtocell according to the second exemplary embodiment;

FIG. 16 shows an adjacent cell list transmitted from a broker femtocell base station to a broker femtocell according to the third exemplary embodiment;

FIG. 19 shows an adjacent cell list transmitted from a radio base station; and

DESCRIPTION OF EMBODIMENTS

Figure 1:
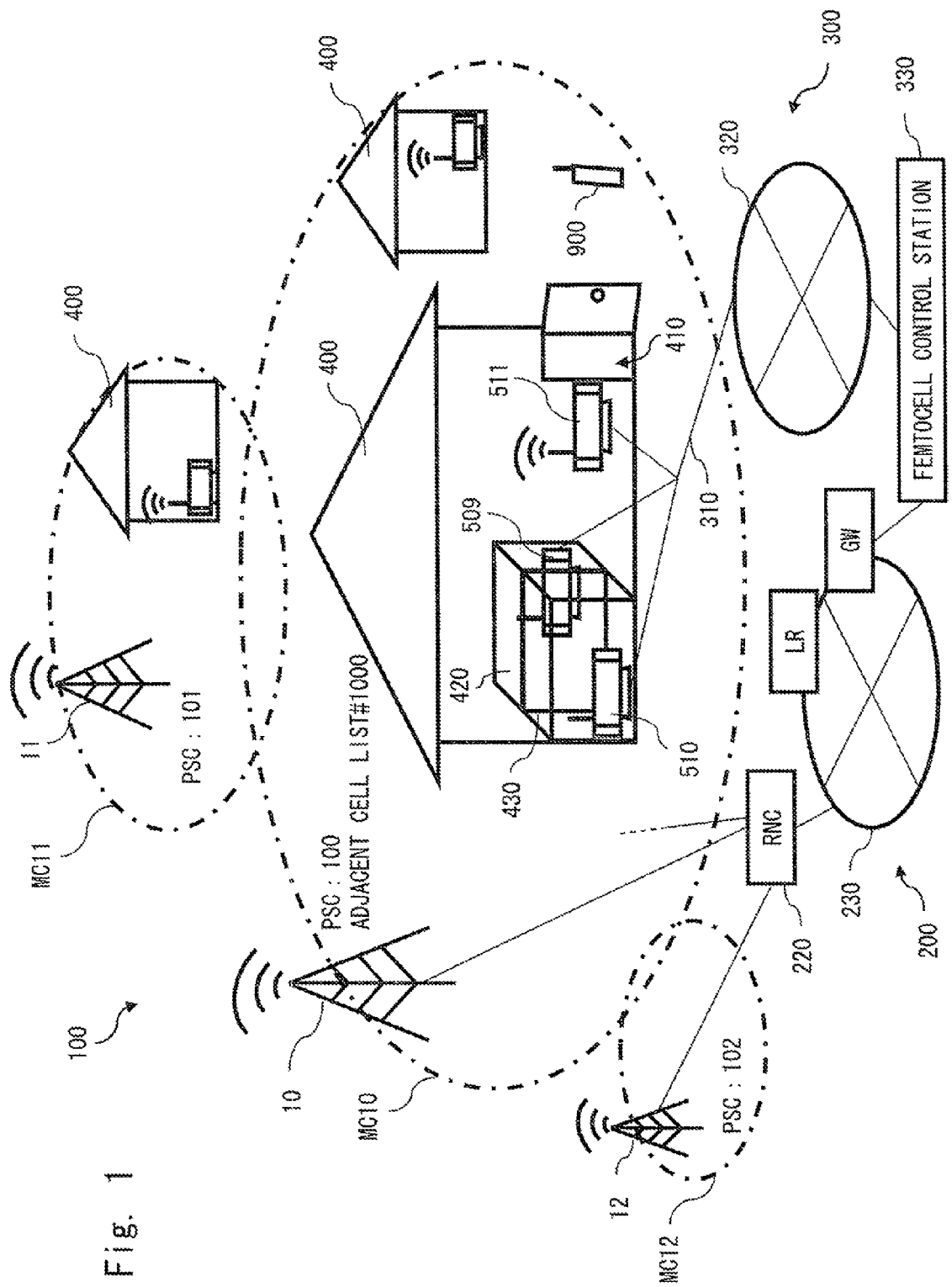
FIG. 1 shows a whole configuration of a radio communication system according to a first exemplary embodiment.

Hereinafter, exemplary embodiments of the present invention will be described with reference to the drawings and reference symbols attached to each element in the drawings.

First Exemplary Embodiment

A first exemplary embodiment according to a radio communication system of the present invention will be described.

FIG. 1 shows a whole configuration of a radio communication system according to the first exemplary embodiment.

A radio communication system 100 according to the first exemplary embodiment includes a public cellular telephone communication network 200 and a femtocell communication network 300.

The public cellular telephone communication network 200 is a known public cellular telephone communication network built for mobile communication terminals (cellular telephones). The public cellular telephone communication network 200 includes base stations 10, 11, and 12, a radio network controller (RNC: mobile communication control station) 220, and a core network 230 for mobile telephone communication.

The base stations 10, 11, and 12 here are base stations forming so-called macro cells, have a cell radius of about several km to 10 km, and can be concurrently connected from several tens of cellular telephones (mobile communication terminals, mobile stations).

In the following description, the base stations 10, 11, and 12 are referred to as macro cell base stations 10, 11, and 12.

In FIG. 1, the macro cell base station 10 covers a macro cell MC10, the macro cell base station 11 covers a macro cell MC11, and the macro cell base station 12 covers a macro cell MC12. The macro cell MC11 and the macro cell MC12 are adjacent to the macro cell MC10.

It is assumed that a primary scramble code (PSC) of the macro cell MC10 is 100, a PSC of the macro cell MC11 is 101, and a PCS of the macro cell MC12 is 102.

Adjacent cell information included in system information transmitted to the macro cell MC10 will be described later.

The femtocell communication network 300 includes a femtocell base station, a broadband line 310, an Internet network 320, and a femtocell control station 330.

The femtocell base station is a small base station installed in a building 400 and covering an area (femtocell) of several tens of meters in radius with small output (e.g., 20 mW or less). The femtocell base station is connected to the broadband line 310 that is already installed in the building 400, and relays telephone conversation by a mobile communication terminal (cellular telephone) 900 through the Internet network 320.

For the sake of convenience of description of the present invention, buildings 400 equipped with the femtocell base stations are in the area covered by the macro cell base stations 10, 11, and 12. Description will be made by taking a case as an example in which femtocell base stations are installed in order to complement a dead area where radio waves from the macro cell base stations 10, 11, and 12 weaken inside buildings.

It is noted, however, the femtocell base stations may typically be provided outside the macro cells as long as the broadband line 310 is installed.

In FIG. 1, the building 400 is in the macro cell MC10.

The building 400 includes one entrance 410, and two rooms 420 and 430. Three femtocell base stations 509, 510, and 511 are installed in the building 400.

Figure 2:
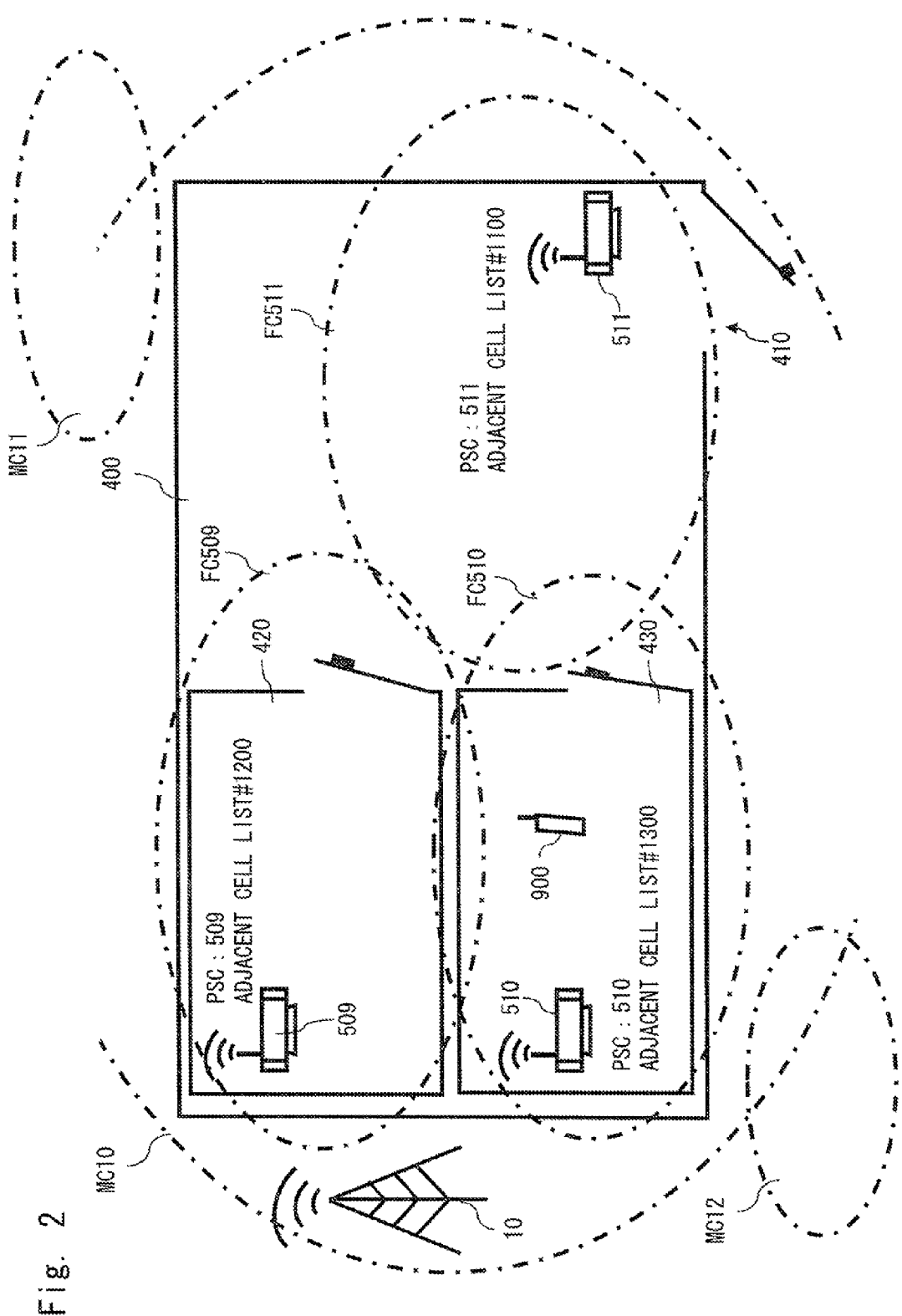
FIG. 2 shows inside a building according to the first exemplary embodiment.

FIG. 2 shows inside the building 400.

The femtocell base stations 511, 509, and 510 are installed in the entrance 410, the room 420, and the room 430 of the building 400, respectively.

While the three femtocell base stations 509, 510, and 511 have the same configuration, the femtocell base station provided in the entrance 410 is called a broker femtocell base station 511 in consideration of the role played in a handover function. The femtocell base stations provided in the rooms 420 and 430 are called sub-femtocell base stations 509 and 510, respectively.

The broker femtocell base station 511 covers a femtocell FC511. The femtocell covered by the broker femtocell base station 511 is called a broker femtocell FC511. Assume that the PSC of the broker femtocell FC511 is 511.

This PSC is called a broker PSC.

For sake of convenience of description, one building 400 is representatively explained in the macro cell MC10 in FIG. 2. It is noted, however, that there are a plurality of buildings 400 in the macro cell MC10.

Figure 3:
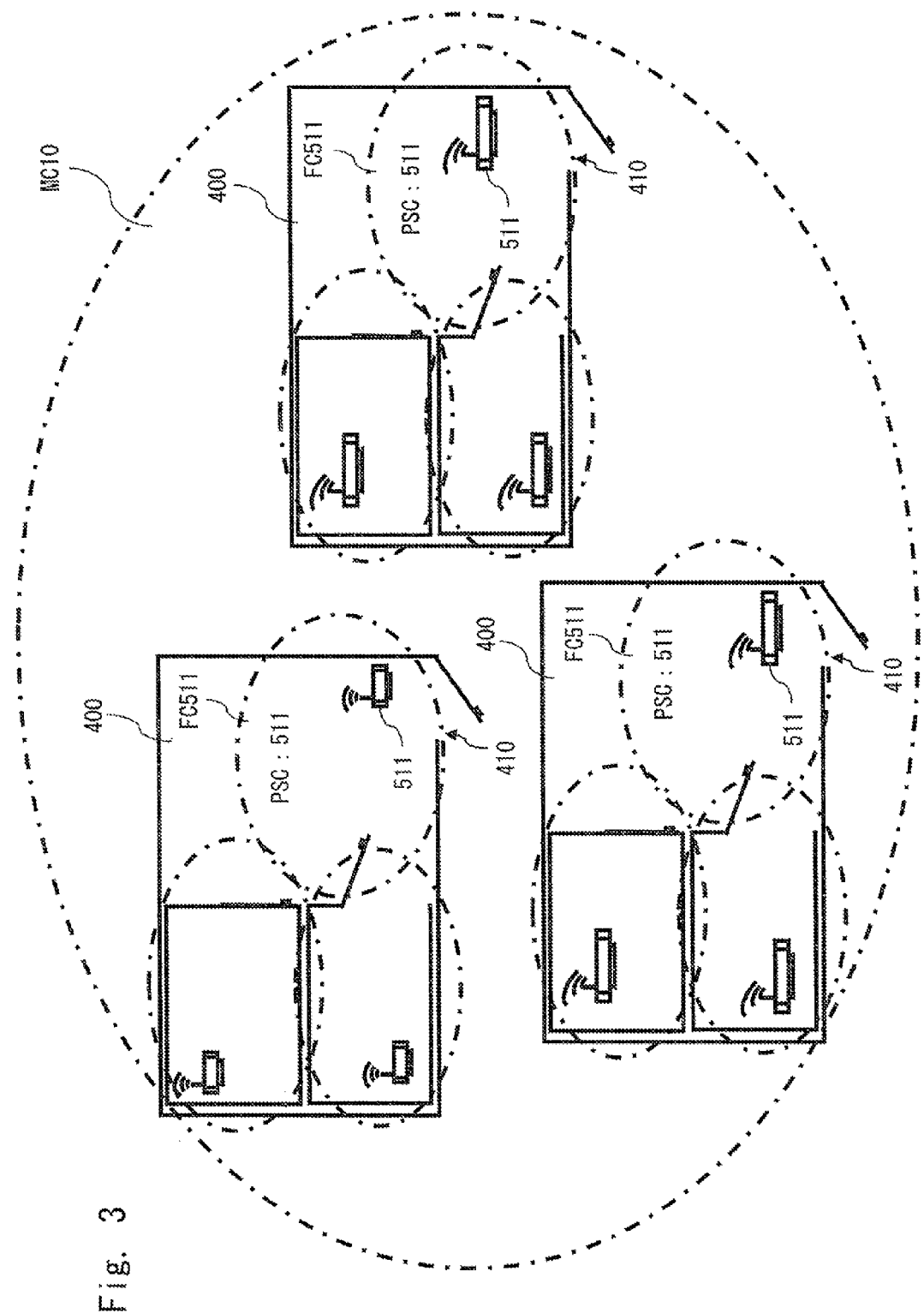
FIG. 3 shows a plurality of buildings in a macro cell.

As shown in FIG. 3, there are a plurality of buildings 400 included in the macro cell MC10, and the broker femtocell base station 511 is installed in the entrance 410 of each of the buildings 400.

In this case, a common PSC is assigned to the broker femtocells FC511 that exist in the macro cell MC10. In the first exemplary embodiment, the PSC of all the broker femtocells FC511 is 511.

The sub-femtocell base station 509 is installed in the room 420, and covers a femtocell FC509.

Assume that the PSC of the femtocell FC509 is 509.

The femtocell base station 510 is installed in the room 430, and covers a femtocell FC510.

Assume that the PSC of the femtocell FC510 is 510.

Each of the femtocell base stations installed in the rooms 420 and 430 is called a sub-femtocell base station, and the femtocells covered by the sub-femtocell base stations 509 and 510 are called sub-femtocells FC509 and FC510, respectively.

Further, the PSC of the sub-femtocell is called a sub PSC.

The sub PSC of the sub-femtocell differs from the broker PSC of the broker femtocell and further differs from the PSC of an adjacent cell.

Next, adjacent cell information included in the system information transmitted to each cell will be described.

FIG. 4 shows an adjacent cell list #1000 transmitted by the macro cell base station 10 to the macro cell MC10.

The adjacent cell list #1000 includes PSCs (PSC: 101, PSC: 102) of the macro cell MC11 and the macro cell MC12 that are macro cells adjacent to the macro cell MC10. Further, the adjacent cell list of the macro cell MC10 includes a broker PSC (PSC: 511) of the broker femtocells that exist in the macro cell MC10.

A plurality of broker femtocell base stations 511 are included in the macro cell MC10. However, since the common broker PSC is assigned to the broker femtocells FC511, only one broker PSC is included in the adjacent cell list #1000.

Note that the priority order for selecting a cell is set in the system information including the adjacent cell list #1000 of the macro cell MC10, and the system is designed so that the mobile communication terminal 900 preferentially selects the broker PSC (PSC: 511) of the broker femtocell FC511 (broker femtocell priority selection setting information).

Next, FIG. 5 shows an adjacent cell list #1100 transmitted to the broker femtocell FC511 by the broker femtocell base station 511.

The adjacent cell list #1100 includes the PSC (PSC: 100) of the macro cell MC10 which is a macro cell including the broker femtocell FC511, the sub-femtocell FC510 (PSC: 510) and the sub-femtocell FC509 (PSC: 509) adjacent to the broker femtocell FC.

Note that the priority order for selecting a cell is set in the system information including the adjacent cell list #1100 of the broker femtocell FC511, and the system is designed so that the mobile communication terminal 900 preferentially selects the sub-femtocells FC509 and FC510 over the macro cell MC10.

FIG. 6 shows an adjacent cell list #1200 transmitted to the sub-femtocell FC509 by the sub-femtocell base station 509.

FIG. 7 shows an adjacent cell list #1300 transmitted to the sub-femtocell FC by the sub-femtocell base station.

The adjacent cell list #1200 includes the broker PSC of the broker femtocell FC511, and the PSC (PSC: 510) of the sub-femtocell FC510 of the adjacent cell.

The adjacent cell list #1300 includes the broker PSC of the broker femtocell FC511, and the PSC (PSC: 510) of the sub-femtocell FC509 of the adjacent cell.

The broker femtocell base stations are installed in the entrances of the buildings, and the plurality of broker femtocell base stations use the common PSC as the broker PSC. The broker PSC is registered in the adjacent cell list of the macro cell.

Further, the sub-femtocell base station uses a PSC other than the broker PSC and the PSC of the adjacent femtocell. Although the PSC of the sub-femtocell base station is registered in the adjacent cell list of the broker femtocell base station, it is not registered in the adjacent cell list of the macro cell.

Described below is cell switching according to the movement of the mobile communication terminal 900 in the first exemplary embodiment having such a configuration.

Described is a case in which a user moves from the outdoors to inside the building 400.

Figure 8:
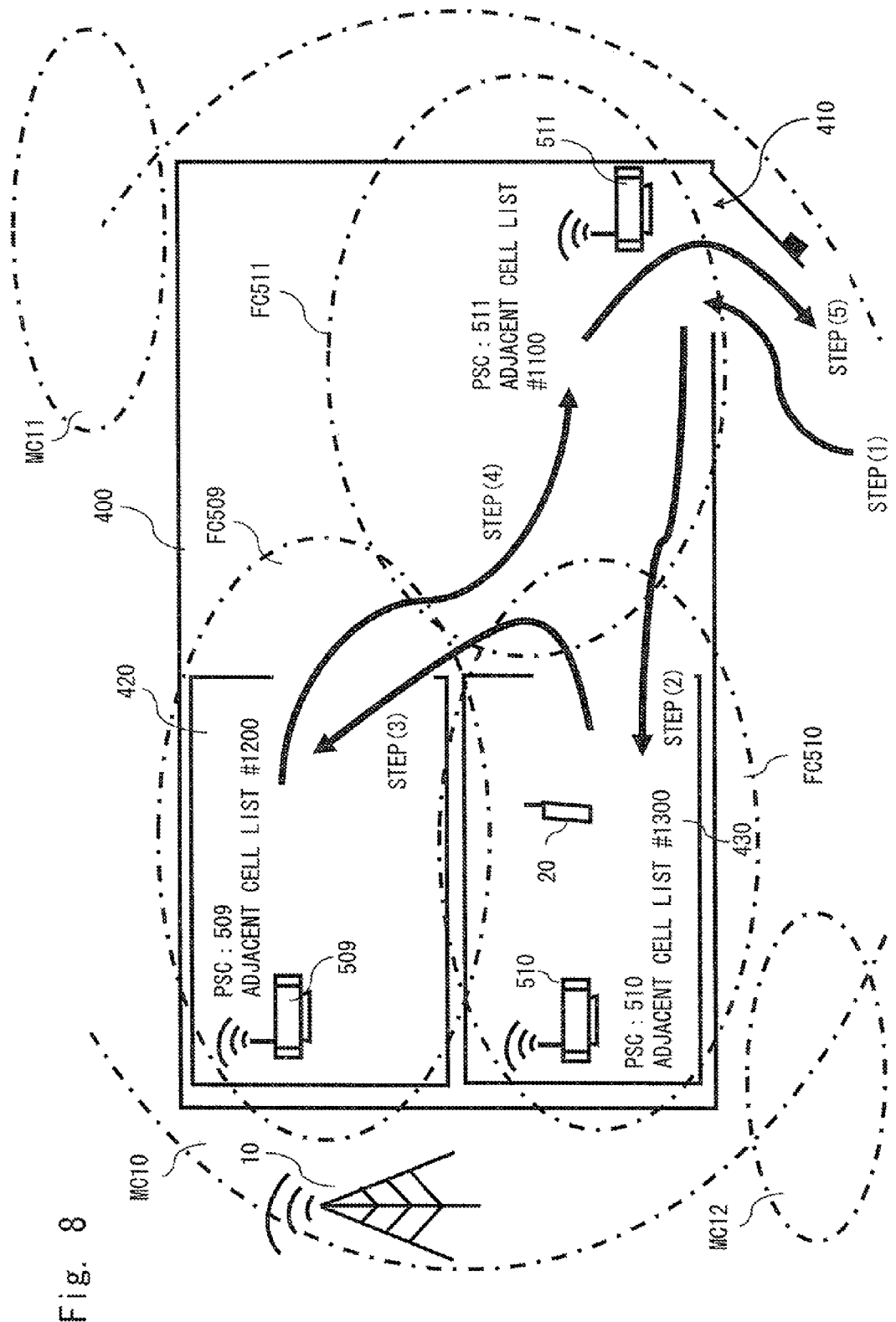
FIG. 8 shows a state of movement into or out of a building according to the first exemplary embodiment.

When moving from the outdoors to inside the building 400, the user enters the building 400 from the outdoors through the entrance 410 as shown in step (1) in FIG. 8. This means that the mobile communication terminal 900 moves from the area of the macro cell MC10 to the area of the broker femtocell FC511.

When the mobile communication terminal 900 is in the area of the macro cell MC10, it obtains the adjacent cell list #1000 shown in FIG. 4.

When the user approaches the entrance 410 of the building 400 and enters the area of the broker femtocell, the mobile communication terminal 900 identifies the broker PSC and detects that it enters the area of the broker femtocell. The mobile communication terminal 900 then switches the cell from the macro cell MC10 to the broker femtocell FC511, and connects the communication link to the broker femtocell base station 511 having the PSC of 511.

It may be possible that the communication with the macro cell base station 10 provides stronger intensity of radio waves around the entrance 410 of the building 400. However, in the system information of the macro cell, the mobile communication terminal 900 is designed to preferentially select the broker femtocell FC511 when the mobile communication terminal enters the area of the broker femtocell FC511 from the macro cell MC10.

Accordingly, the cell is preferentially switched from the macro cell MC10 to the broker femtocell FC511 according to the movement from outside of the building to inside the building 400.

Described next is a case in which the user moves to a room in the building.

The user enters the room 430 from the entrance 410 as shown in step (2) in FIG. 8.

This means that the mobile communication terminal 900 moves from the area of the broker femtocell FC511 to the area of the sub-femtocell FC510.

When the mobile communication terminal 900 is in the area of the broker femtocell FC511, it obtains the adjacent cell list #1100 as shown in FIG. 5.

When the mobile communication terminal 900 enters the room 430 and moves from the area of the broker femtocell FC511 to the area of the sub-femtocell FC510 having the PSC of 510, it connects the communication link to the sub-femtocell base station 510 having the PSC of 510 according to the priority order in the adjacent cell list #1100.

Accordingly, the cell is switched from the broker femtocell FC511 to the sub-femtocell FC510 according to the movement from the entrance 410 to the room 430.

Described next is a case in which the user moves from the room 430 to the room 420 in the building.

The user moves from the room 430 to the room 420 as shown in step (3) in FIG. 8. Then, the mobile communication terminal 900 moves from the area of the sub-femtocell FC510 to the area of the sub-femtocell FC509.

When the mobile communication terminal 900 is in the area of the sub-femtocell FC510, it obtains the adjacent cell list #1300 as shown in FIG. 7.

When the mobile communication terminal 900 is moved outside of the room and the state of the communication with the sub-femtocell base station 510 degrades, it selects a base station having a good state of radio waves from the adjacent cell list #1300.

In this case, it is recognized that the sub-femtocell FC509 having the PSC of 509 has a good state of radio waves, and the communication link is connected to the sub-femtocell base station 509 having the PSC of 509.

Accordingly, the cell is switched from the sub-femtocell FC510 to the sub-femtocell FC509 according to the movement from the room 430 to the room 420.

Now, a case in which the user moves from the room 420 to the entrance 410 will be described.

The user moves from the room 420 to the entrance 410 as shown in step (4) in FIG. 8. Then, the mobile communication terminal 900 moves from the area of the sub-femtocell FC509 to the area of the broker femtocell FC511.

When the mobile communication terminal 900 is in the area of the sub-femtocell FC509, it obtains the adjacent cell list #1200 in FIG. 6.

When the mobile communication terminal 900 is moved outside of the room and the state of the communication with the sub-femtocell base station 509 degrades, it selects a base station having a good state of radio waves from the adjacent cell list #1200.

In this case, it is recognized that the broker femtocell FC511 has a good state of radio waves, and the communication link is connected to the broker femtocell base station 511.

Accordingly, the cell is switched from the sub-femtocell FC509 to the broker femtocell FC511 according to the movement from the room 420 to the entrance 410.

Now, a case in which the user moves from the entrance 410 to outside of the building 400 will be described.

The user moves from the entrance 410 to outside of the building 400 as shown in step (5) in FIG. 8. Then, the mobile communication terminal 900 moves from the area of the broker femtocell FC511 to the area of the macro cell MC10.

When the mobile communication terminal 900 is in the area of the broker femtocell FC511, it obtains the adjacent cell list #1100 shown in FIG. 5.

When the mobile communication terminal 900 is moved outside of the building 400 through the entrance 410 and the state of the communication with the broker femtocell base station 511 degrades, it selects a base station having a good state of radio waves from the adjacent cell list #1100.

In this case, it is recognized that the macro cell MC10 has a good state of radio waves, and the communication link is connected to the macro cell base station 10.

Accordingly, the cell is switched from the broker femtocell FC511 to the macro cell MC10 according to the movement from the entrance 410 to outside of the building 400.

The following effects can be obtained according to the first exemplary embodiment having such a configuration.

(1) The broker femtocell base station 511 is installed in each of the entrances 410 of the buildings 400, and the PSC of the broker femtocells FC511 is common. The PSC of the broker femtocell is registered in the adjacent cell list #1000 as the system information of the macro cell MC10.

Accordingly, when entering the building from the area of the macro cell MC10 to the building through the entrance 410, the mobile communication terminal 900 is able to recognize the broker femtocell FC511 registered in the adjacent cell list #1000 and camp on to the broker femtocell FC511.

(2) It is expected that quite a number of femtocells are installed in the macro cell MC10. Thus, if different PSCs are set for each of all the femtocells and these PSCs of the femtocells are registered in the adjacent cell list, the information amount overflows.

In this respect, in the first exemplary embodiment, only the broker PSC used in common among the broker femtocells FC511 is registered in the adjacent cell list #1000 of the macro cell MC10.

Accordingly, the information amount of the adjacent cell list can be limited to the appropriate amount.

(3) The sub-femtocell base stations 509 and 510 are respectively installed in the rooms of the building 400, which can provide good radio communication in the rooms.

Since it is impossible to register all the PSCs used in the sub-femtocells FC509 and FC510 in the adjacent cell list of the macro cell MC due to its increased amount of information, it is impossible to directly switch the macro cell MC10 to the sub-femtocell FC509 or FC510 of the room 420 or 430.

In this respect, the broker PSC of the broker femtocell FC511 that covers the entrance 410 of the building 400 is registered in the adjacent cell list #1000 of the macro cell MC10 in the first exemplary embodiment. Then, the PSCs of the sub-femtocells FC509 and FC510 of the rooms are registered in the adjacent cell list #1100 of the broker femtocell FC511.

Accordingly, when the user enters the building 400 from the outdoors, the cell can be switched from the macro cell MC10 to the sub-femtocell FC509 or FC510 through the broker femtocell FC511, which provides good radio communication using the sub-femtocell FC509 or FC510 in the room. Accordingly, according to the first exemplary embodiment, the cell can be switched to the sub-femtocell FC509 or 510 which is not registered in the adjacent cell list of the macro cell MC through the broker femtocell FC511.

(4) When the cell is switched from the macro cell MC10 to the broker femtocell FC511, the system is designed so as to preferentially switch the cell to the broker femtocell.

In this way, by actively switching the cell from the macro cell MC10 to the femtocell, it is possible to reduce the number of communication terminals connected to the macro cell base station 10 and the load of the macro cell base station 10.

Further, in the handover from the broker femtocell FC511, the cell is preferentially switched to the sub-femtocell FC509 or FC510, and further, the macro cell is not registered in the adjacent cell lists #1200 and #1300 of the sub-femtocells FC509 and FC510.

Accordingly, the communication using the femtocells instead of using the macro cell MC10 is definitely performed inside the building, which can achieve a macro traffic offload effect as the whole radio communication system.

Second Exemplary Embodiment

Next, a second exemplary embodiment will be described.
The basic configuration of the second exemplary embodiment is similar to that of the first exemplary embodiment. The difference is that a building has a plurality of entrances in the second exemplary embodiment.

Figure 9:
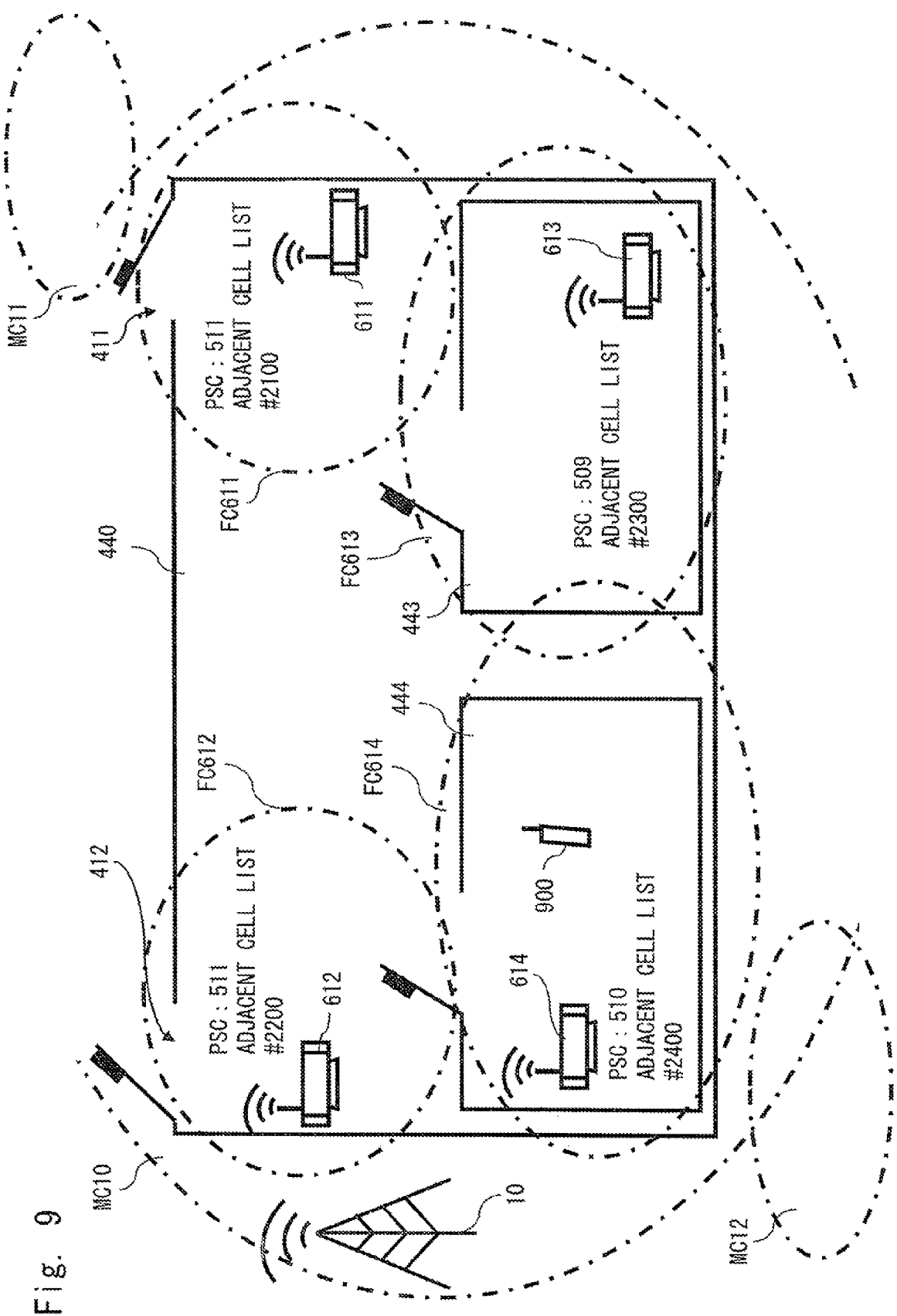
FIG. 9 shows a second exemplary embodiment.

As shown in FIG. 9, a building 440 includes two entrances 411 and 412, and includes rooms 443 and 444 inside.

The room 443 is provided in the side of the entrance 411, and the room 444 is provided in the side of the entrance 412.

Broker femtocell base stations 611 and 612 are installed in the two entrances 411 and 412, respectively. The broker femtocell base station 611 is installed in the entrance 411, and the broker femtocell base station 612 is installed in the entrance 412. The broker femtocell base station 611 covers a broker femtocell FC611, and the broker femtocell base station 612 covers a broker femtocell FC612.

The PSC of the broker femtocells FC611 and FC612 is common, and the PSC of 511 is used as the broker PSC.

Further, a sub-femtocell base station 613 is installed in the room 443, and the PSC of a sub-femtocell FC613 is set as 509, which is different from that of the broker femtocells FC611 and FC612.

A sub-femtocell base station 614 is installed in the room 444, and the PSC of a sub-femtocell FC614 is set as 510, which is different from that of the broker femtocells FC611 and FC612 and is also different from the adjacent sub-femtocell FC613.

Next, adjacent cell information included in system information transmitted to each cell will be described.

An adjacent cell list transmitted by the macro cell base station 10 to the macro cell MC10 is the same to the adjacent cell list #1000 shown in FIG. 4. Specifically, the adjacent cell list #1000 includes PSCs (PSC: 101, PSC: 102) of the macro cell MC12 and the macro cell MC11 adjacent to the macro cell MC10, and the PSC (PSC: 511) of the broker femtocells.

FIG. 10 shows an adjacent cell list #2100 transmitted by the broker femtocell base station 611 to the broker femtocell FC611.

The adjacent cell list #2100 includes a PSC (PSC: 100) of the macro cell MC which is a macro cell including the broker femtocell FC611, and the sub-femtocell FC613 (PSC: 509) which is adjacent to the broker femtocell FC611.

Further, FIG. 11 is an adjacent cell list #2200 transmitted by the broker femtocell base station 612 to the broker femtocell FC612.

The adjacent cell list #2200 includes the PSC (PSC: 100) of the macro cell MC10 which is a macro cell including the broker femtocell FC612, and the sub-femtocell FC614 (PSC: 510) which is adjacent to the broker femtocell FC612.

FIG. 12 shows an adjacent cell list #2300 transmitted by the sub-femtocell base station 613 to the sub-femtocell FC613.

FIG. 13 shows an adjacent cell list #2400 transmitted by the sub-femtocell base station 614 to the sub-femtocell FC614.

The adjacent cell list #2300 includes the broker PSC (PSC: 511) of the broker femtocell FC611 and the PSC (PSC: 510) of the sub-femtocell FC614 which is an adjacent femtocell.

The adjacent cell list #2400 includes the broker PSC (PSC: 511) of the broker femtocell FC612, and the PSC (PSC: 509) of the sub-femtocell FC613 which is an adjacent femtocell.

Described below is the cell switching according to the movement of the mobile communication terminal in the second exemplary embodiment having such a configuration.

Figure 14:
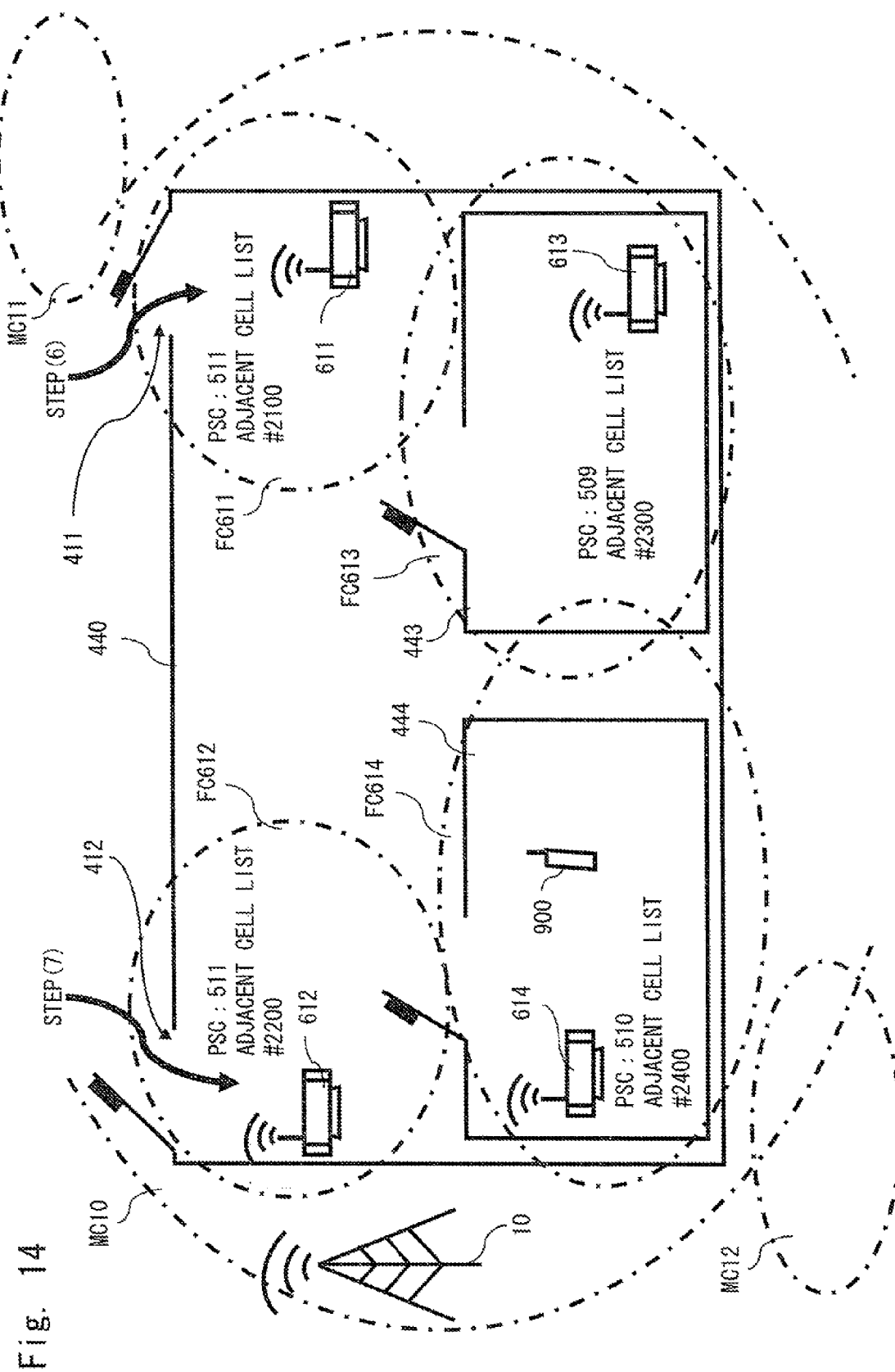
FIG. 14 shows a state of movement into or out of a building according to the second exemplary embodiment.

There are two routes to enter the building 440 from the outside of the building: one is entering through the entrance 411 as shown in step (6) in FIG. 14; and the other is entering through the entrance 412 as shown in step (7) in FIG. 14.

In both cases, the mobile communication terminal 900 obtains the adjacent cell list #1000 (FIG. 4) when being within the area of the macro cell MC10.

When the user approaches the entrance 411 or 412 to enter the building 440 through the entrance 411 or 412 and enters the area of the broker femtocell FC611 or FC612, the cell is preferentially switched to the broker femtocell FC611 or 612.

In this way, the mobile communication terminal 900 switches the cell from the macro cell MC10 to the broker femtocell FC611 or FC612, and connects the communication link to the broker femtocell base station 611 or 612 having the PSC of 511.

Since the PSC of the broker femtocells FC611 and FC612 is common, the cell can be switched from the macro cell MC10 to the broker femtocell FC611 or 612 by the common PSC (PSC: 511) no matter through which entrance 411 or 412 the user passes.

After being moved into the building 440, the terminal is moved to the room (443, 444), moved from a room to another room, or moved outside of the building through the entrance 411 or 412.

Similarly to the first exemplary embodiment, in these cases, the cells are switched by referring to the adjacent cell information #2100, #2200, #2300, and #2400 transmitted to the respective cells.

The following effects can be obtained according to the second exemplary embodiment.

In the second exemplary embodiment, the broker femtocell base stations 611 and 612 are respectively arranged in the entrances 411 and 412 even when there are included a plurality of entrances in the building 440. The PSC of the broker femtocells FC611 and FC612 is common, and this common broker PSC is registered in the adjacent cell information #1000 of the macro cell.

Accordingly, it is only required to add one broker PSC to the adjacent cell list #1000 of the macro cell MC10, and the information amount of the adjacent cell list can be limited to the appropriate amount.

Further, no matter through which entrance 411 or 412 the user enters the building 440, the mobile communication terminal 900 is able to recognize the broker femtocells FC611 and FC612 registered in the adjacent cell list #1000, and camp on to the broker femtocell base stations 611 and 612 from the macro cell base station 10.

Third Exemplary Embodiment

Next, a third exemplary embodiment will be described.

The basic configuration of the third exemplary embodiment is similar to that of the first exemplary embodiment. The difference is that a building has a plurality of entrances in the third exemplary embodiment.

Figure 15:
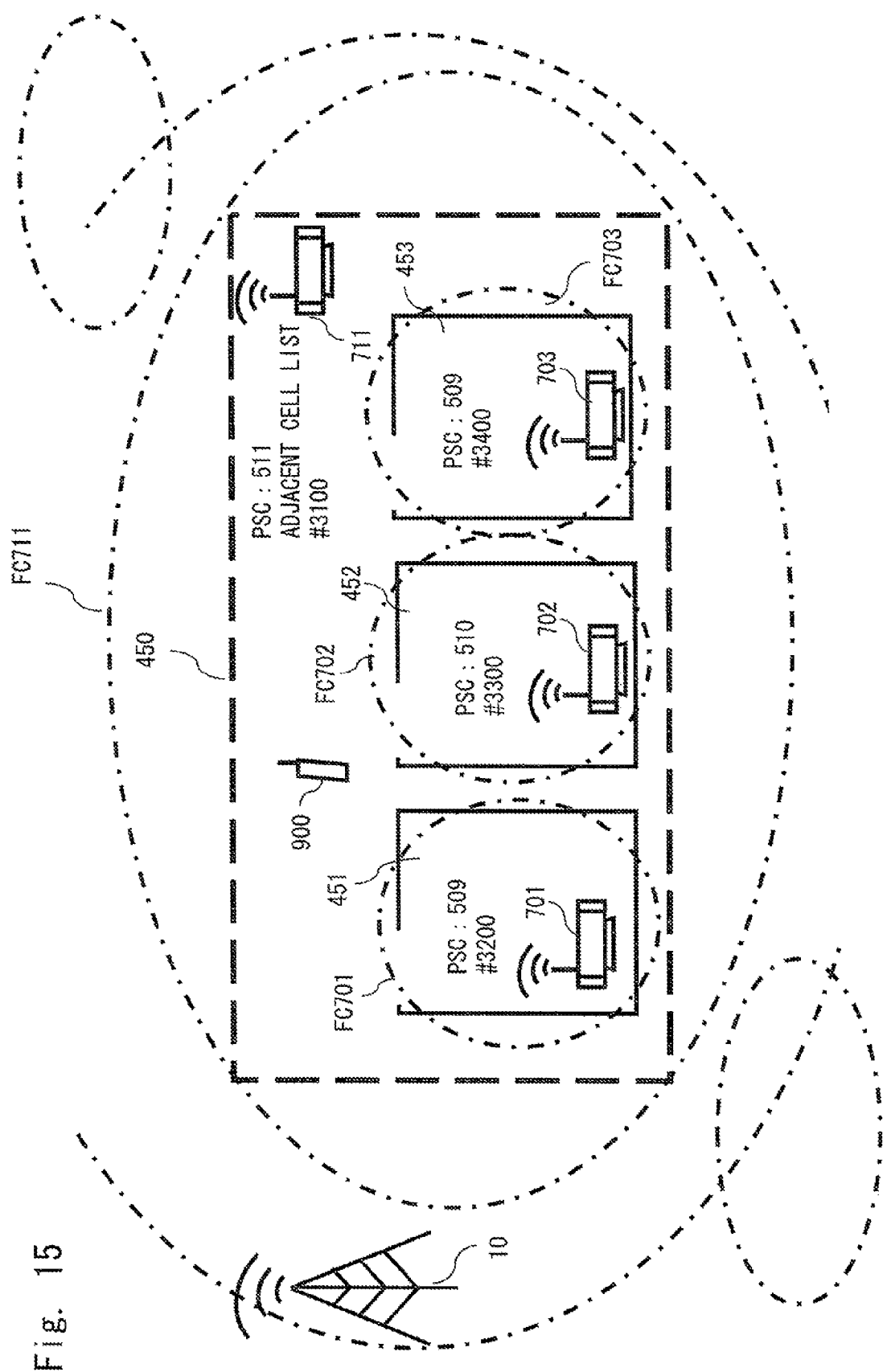
FIG. 15 shows a third exemplary embodiment.

In FIG. 15, a building 450 has a plurality of entrances.

In this case, the building 450 may be designed in such a way as to allow a user to enter through any of the entrances instead of a fixed entrance.

Alternatively, the third exemplary embodiment may include a case in which quite a number of entrances are provided and it is difficult to install a broker femtocell base station in each entrance since it requires significant cost and large space.

There are three rooms in the building 450.

In FIG. 15, the rooms are denoted by a room 451, a room 452, and a room 453 from left to right.

A broker femtocell base station 711 is installed to include all the entrances through which the user can enter in a coverage area of a broker femtocell FC711.

The PSC of the broker femtocell FC711 is 511, and it is commonly assigned to broker femtocells FC711 that exist in the macro cell MC10.

Sub-femtocell base stations 701, 702, and 703 are installed in the rooms 451, 452, and 453, respectively.

The sub-femtocell base station 701 is installed in the room 451, and covers a sub-femtocell FC701.

The PSC of the sub-femtocell FC701 is 509.

The sub-femtocell base station 702 is installed in the room 452, and covers a femtocell FC702.

The PSC of the sub-femtocell FC702 is 510.

The sub-femtocell base station 703 is installed in the room 453, and covers a femtocell FC703.

The PSC of the sub-femtocell FC703 is 509.

It is required that the PSC of the sub-femtocell FC703 that covers the room 453 is different from the PSC (PSC: 511) of the broker femtocell FC711, and is further different from the PSC (PSC: 510) of the adjacent cell FC702.

In this respect, since the room 451 is not adjacent to the room 453 and the sub-femtocell FC703 is not adjacent to the sub-femtocell FC701, the same PSC (PSC: 509) may be used.

Adjacent cell information included in system information transmitted to each cell will be described.

The adjacent cell list transmitted to the macro cell MC10 by the macro cell base station 10 is the same to the adjacent cell list #1000 shown in FIG. 4. Specifically, the adjacent cell list #1000 includes PSCs (PSC: 101, PSC: 102) of the macro cell MC11 and the macro cell MC12 adjacent to the macro cell MC10, and a PSC (PSC: 511) of the broker femtocell FC711.

FIG. 16 is an adjacent cell list #3100 transmitted to the broker femtocell FC711 by the broker femtocell base station 711.

The adjacent cell list #3100 includes a PSC (PSC: 100) of the macro cell MC10 which is a macro cell including the broker femtocell FC711.

Further, the adjacent cell list #3100 includes the sub-femtocell FC701 (PSC: 509), the sub-femtocell FC702 (PSC: 510), and the sub-femtocell FC703 (PSC: 509) included in the broker femtocell FC711.

An adjacent cell list #3200 transmitted to the sub-femtocell FC701 by the sub-femtocell base station 701 includes the broker PSC (PSC: 511) of the broker femtocell FC711, and the PSC (PSC: 510) of the sub-femtocell FC702.

This is similar to the state shown in FIG. 12.

Further, an adjacent cell list #3300 transmitted to the sub-femtocell FC702 by the sub-femtocell base station 702 includes the broker PSC (PSC: 511) of the broker femtocell FC711, and the PSC (PSC: 509) of the sub-femtocells FC701 and FC703.

This is similar to the state shown in FIG. 13.

An adjacent cell list #3400 transmitted to the sub-femtocell FC703 by the sub-femtocell base station 703 is the same to the adjacent cell list #3200.

Described below is cell switching according to the movement of the mobile communication terminal in the third exemplary embodiment having such a configuration.

There are a number of routes from outside of the building to inside of the building.

The mobile communication terminal 900 obtains the adjacent cell list #1000 (FIG. 4) when it is in the area of the macro cell MC10. No matter through which route the user enters the building 450, it recognizes the broker femtocell FC711 and preferentially switches the cell to the broker femtocell FC711. In this way, the cell is switched from the macro cell MC10 to the broker femtocell FC711 no matter through which entrance the user passes.

After entering the building 450, the terminal may be moved to the rooms 451, 452, and 453, moved from one room to another room, or moved outside of the building through an entrance.

Similarly to the first exemplary embodiment, the cells are switched by referring to the adjacent cell information #3100, #3200, #3300, and #3400 transmitted to the respective cells.

According to the third exemplary embodiment, when the building can be accessed by any of the entrances or even when there are quite a number of entrances, all the entrances are covered by the broker femtocell FC711.

Accordingly, no matter through which entrance the user enters the building 450, the mobile communication terminal 900 is able to recognize the broker femtocell FC711 registered in the adjacent cell list #1000 and to camp on to the broker femtocell base station 711 from the macro cell base station 10.

The present invention is not limited to the exemplary embodiments described above, but may be changed as appropriate without departing from the spirit of the present invention.

Although shown as an example is a case in which the PSC having the number of 511 is commonly used in the broker PSC of all the broker femtocell base stations, two or more broker PSCs may be prepared. In short, a plurality of broker PSCs may be used as long as the information amount does not exceed the amount that can be notified as the adjacent cell list.

For example, in the second exemplary embodiment, different broker PSCs may be set for the broker femtocell base station 611 and the broker femtocell base station 612, and these PSCs may be registered in the adjacent cell list of the macro cell.

Figure 17:
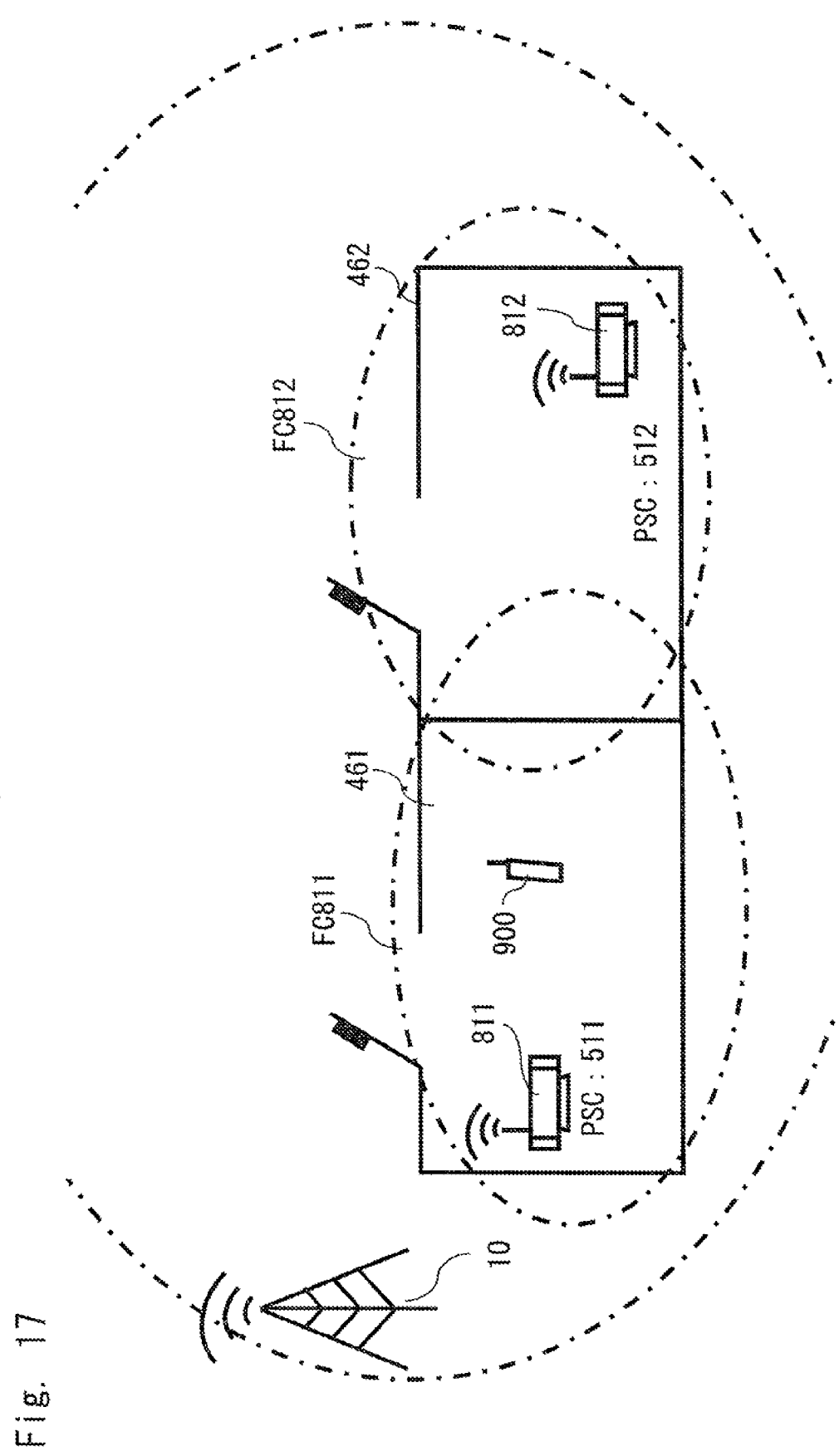
FIG. 17 shows a variant example.
Figure 18:
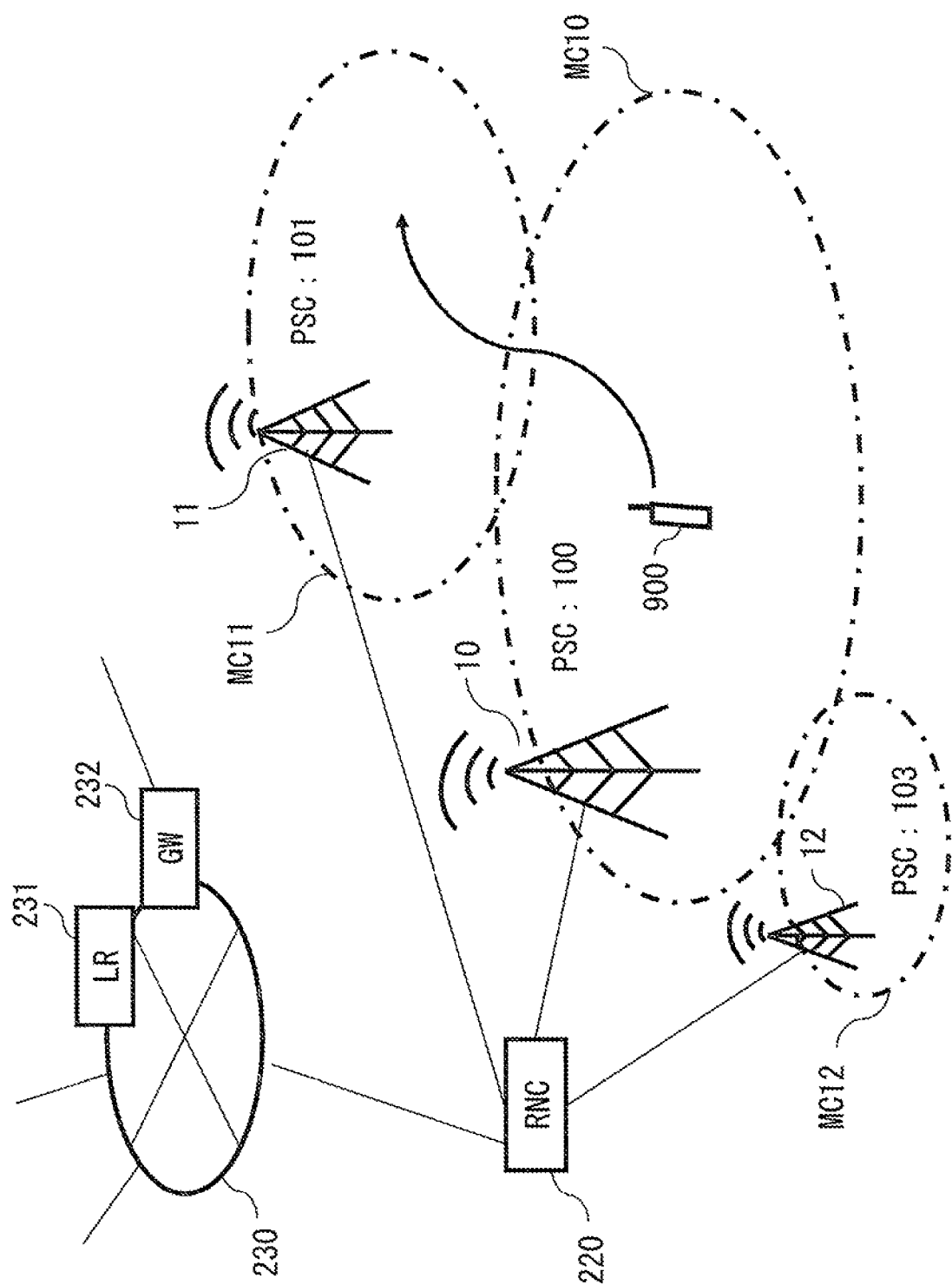
FIG. 18 shows a configuration of a related radio communication system.
Figure 20:
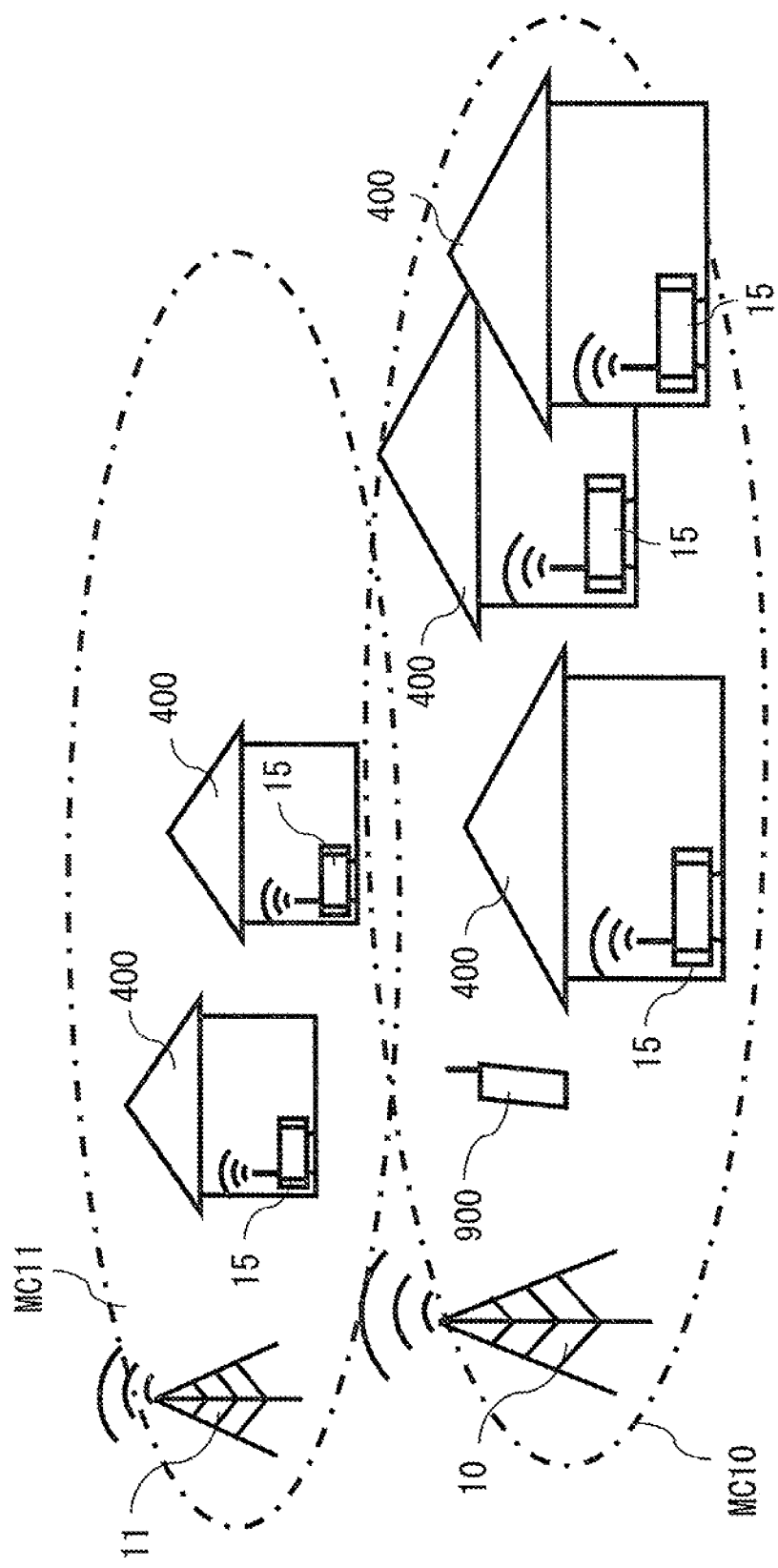
FIG. 20 shows a state in which femtocell base stations are installed.

Furthermore, another example may include a case in which small rooms 461 and 462 are lined in the macro cell MC10 as shown in FIG. 17.

In this case, femtocell base stations (broker femtocell base stations) 811 and 812 are installed in the rooms 461 and 462, respectively, and broker PSCs of 511 and 512 are assigned to the femtocell base stations 811 and 812, respectively.

The broker PSCs (511, 512) of broker femtocells FC 811 and 812 that are required to be directly switched from the macro cell MC10 are registered in the adjacent cell list included in the system information of the macro cell MC10.

In this way, it is possible to directly switch the cell from the macro cell MC to each of the broker femtocells FC 811 and FC812.

Even in such a case, since the number of codes required as the broker PSC is limited, they can be included in the adjacent cell list of the system information.

While described above is an example of using the PSC as the identification code, it is not limited to this.

Other typical scrambling codes may be used, and a control channel or the like may be selected as appropriate according to the communication format.

Furthermore, a special code may be prepared as the identification code.

The PSC is preferred, however, in consideration of the use in both of the macro cell base station and the femtocell base station.

While the present invention has been described as a configuration of hardware in the exemplary embodiments above, the present invention is not limited to this. The present invention may achieve any processing by causing a central processing unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (read only memory), CD-R, CD-R/W, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been described with reference to the exemplary embodiments, the present invention is not limited to the above description. Various changes that can be understood by a person skilled in the art may be made in the configuration and the details of the present invention without departing from the spirit of the present invention.

This application claims the benefit of priority, and incorporates herein by reference in its entirety, the following Japanese Patent Application No. 2009-142050 filed on Jun. 15, 2009.

INDUSTRIAL APPLICABILITY

The present invention relates to a radio communication system. More specifically, the present invention is applicable to a radio communication system that uses a small base station (femtocell base station) having a coverage area of about several tens of meters in radius called femtocell.

REFERENCE SIGNS LIST 10, 11, 12 MACRO CELL BASE STATION
15 FEMTOCELL BASE STATION
100 RADIO COMMUNICATION SYSTEM
200 PUBLIC CELLULAR TELEPHONE COMMUNICATION NETWORK
230 CORE NETWORK
300 FEMTOCELL COMMUNICATION NETWORK
310 BROADBAND LINE
320 INTERNET NETWORK
330 FEMTOCELL CONTROL STATION
400 BUILDING
410 ENTRANCE
420 ROOM
430 ROOM
440 BUILDING
411 ENTRANCE
412 ENTRANCE
443 ROOM
444 ROOM
450 BUILDING
451 ROOM
452 ROOM
453 ROOM
461 ROOM
509 SUB-FEMTOCELL BASE STATION
510 SUB-FEMTOCELL BASE STATION
511 BROKER FEMTOCELL BASE STATION
611 BROKER FEMTOCELL BASE STATION
612 BROKER FEMTOCELL BASE STATION
613 SUB-FEMTOCELL BASE STATION
614 SUB-FEMTOCELL BASE STATION
701 SUB-FEMTOCELL BASE STATION
702 SUB-FEMTOCELL BASE STATION
703 SUB-FEMTOCELL BASE STATION
711 BROKER FEMTOCELL BASE STATION
900 MOBILE COMMUNICATION TERMINAL

The invention claimed is:

1. A radio communication system comprising:
a macro cell base station for performing radio communication with a mobile communication terminal to relay telephone conversation between mobile communication terminals, the macro cell base station covering an area of a macro cell; and
a plurality of femtocell base stations installed in a plurality of buildings in the macro cell, each of the femtocell base stations covering an area narrower than the macro cell, wherein
a broker femtocell base station that covers an area of an entrance is installed in the entrance of each of the buildings, and a broker identification code as an identification code is set in the broker femtocell base station, and
an adjacent cell list and broker femtocell priority selection set information are set as system information of the macro cell, the adjacent cell list including an area identification code of each of adjacent macro cells and a broker identification code set in the broker femtocell base station, the broker femtocell priority selection set information being the information for preferentially selecting the broker femtocell base station, wherein
a plurality of sub-femtocell base stations are installed in the building in addition to the broker femtocell base station,
a sub-area identification code is set in each of the sub-femtocell base stations, the sub-area identification code being different from the broker identification code and different from a sub-area identification code of an adjacent femtocell, and
an adjacent cell list and sub-femtocell priority selection set information are set as system information of the broker femtocell, the adjacent cell list including an area identification code of the macro cell including the broker femtocell and the sub-area identification code of the adjacent femtocell, the sub-femtocell priority selection set information being the information for preferentially selecting the sub-femtocell base station.

2. The radio communication system according to claim 1, wherein the broker identification code set in the broker femtocell base station is common to a plurality of broker femtocell base stations.

3. The radio communication system according to claim 1, wherein the adjacent cell list is set as system information of the sub-femtocell, the adjacent cell list including the broker identification code of the broker femtocell base station and the sub-area identification code of the adjacent sub-femtocell.

4. The radio communication system according to claim 1, wherein the identification codes are selected from primary scrambling codes.

5. The radio communication system according to claim 1, wherein
a plurality of entrances are provided in each of the buildings, and
a broker femtocell base station in which a common broker identification code is set is installed in each of the entrances.

6. The radio communication system according to claim 1, wherein
a plurality of entrances are provided in each of the buildings, and
a broker femtocell base station is installed to include the plurality of entrances in a coverage area.

7. A radio communication method using a radio communication system comprising:
a macro cell base station for performing radio communication with a mobile communication terminal to relay telephone conversation between mobile communication terminals, the macro cell base station covering an area of a macro cell; and
a plurality of femtocell base stations installed in a plurality of buildings in the macro cell, each of the femtocell base stations covering an area narrower than the macro cell, wherein a broker femtocell base station that covers an area of an entrance is installed in the entrance of each of the buildings, and a broker identification code as an identification code is set in the broker femtocell base station, and an adjacent cell list and broker femtocell priority selection set information are set as system information of the macro cell, the adjacent cell list including an area identification code of each of adjacent macro cells and a broker identification code set in the broker femtocell base station, the broker femtocell priority selection set information being the information for preferentially selecting the broker femtocell base station, wherein a plurality of sub-femtocell base stations are installed in the building in addition to the broker femtocell base station, a sub-area identification code is set in each of the sub-femtocell base stations, the sub-area identification code being different from the broker identification code and different from a sub-area identification code of an adjacent femtocell, and an adjacent cell list and sub-femtocell priority selection set information are set as system information of the broker femtocell, the adjacent cell list including an area identification code of the macro cell including the broker femtocell and the sub-area identification code of the adjacent femtocell, the sub-femtocell priority selection set information being the information for preferentially selecting the sub-femtocell base station.

8. The radio communication method according to claim 7, the broker identification code set in the broker femtocell base station is common to a plurality of broker femtocell base stations.

9. The radio communication method according to claim 7, wherein the adjacent cell list is set as system information of the sub-femtocell, the adjacent cell list including the broker identification code of the broker femtocell base station and the sub-area identification code of the adjacent sub-femtocell.

10. The radio communication method according to claim 7, wherein the identification codes are selected from primary scrambling codes.

11. The radio communication method according to claim 7, wherein a plurality of entrances are provided in each of the buildings, and a broker femtocell base station in which a common broker identification code is set is installed in each of the entrances.

12. The radio communication method according to claim 7, wherein a plurality of entrances are provided in each of the buildings, and a broker femtocell base station is installed to include the plurality of entrances in a coverage area.

* * * * *